United States Patent [19]

Catena

[11] Patent Number: 4,964,916

[45] Date of Patent: Oct. 23, 1990

[54] ANTI-STATIC VARNISH COMPOSITIONS

[75] Inventor: Robert Catena, Orange, N.J.

[73] Assignee: Sun Chemical Corporation, Fort Lee, N.J.

[21] Appl. No.: 497,948

[22] Filed: Mar. 22, 1990

Related U.S. Application Data

[62] Division of Ser. No. 378,356, Jul. 11, 1989, Pat. No. 4,931,522.

[51] Int. Cl.$^5$ ................ C08L 67/00; C08L 91/00
[52] U.S. Cl. ................................ 106/228; 106/222; 106/241; 524/913; 524/364; 524/379; 524/513; 524/500
[58] Field of Search .............. 526/292.2, 312, 320; 106/221, 222, 228, 241; 524/364, 379, 500

[56] References Cited

U.S. PATENT DOCUMENTS

| | | | |
|---|---|---|---|
| 4,371,489 | 2/1983 | McGrail | 264/129 |
| 4,587,269 | 5/1986 | Thomas, Jr. | 521/38 |
| 4,623,564 | 11/1986 | Long et al. | 427/393 |

FOREIGN PATENT DOCUMENTS 6047411  9/1979  Japan .

*Primary Examiner*—William R. Dixon, Jr.
*Assistant Examiner*—Carol Bonner
*Attorney, Agent, or Firm*—Jack Matalon

[57] ABSTRACT

A copolymer reaction product of a salt of a quaternary acrylate and a polyalkylene glycol acrylate. The copolymer is useful as an anti-static agent in anti-static varnish compositions for packaging gravure printing.

19 Claims, No Drawings

ANTI-STATIC VARNISH COMPOSITIONS

This is a division of co-pending application Ser. No. 07/378,356 filed on 07/11/89, U.S. Pat. No. 4,931,522, issued 06/05/90.

BACKGROUND OF THE INVENTION

1. Field of the Invention:

The present invention relates to antistatic varnish compositions.

2. Description of the Related Art:

Anti-static varnishes are well known and various compositions have been used for this purpose.

For example, U.S. Pat. No. 4,371,489 to McGrail discloses a molecularly oriented thermoplastic film having an anti-static coating layer. The coating layer is formed from a film-forming composition comprising a copolymer of alkyl esters of acrylic and methacrylic acids and a phosphate ester. The phosphate ester provides the anti-static properties.

It has also been known to use anti-static materials in packaging. U.S. Pat. No. 4,623,564 to Long et al. discloses a rigid packaging material including a layer of anti-static plastic. The plastic is made electrostatic free by the addition of tertiary animal fatty amine, and is placed on a sheet of stiff substrate material to provide an anti-static container for the packaging of static sensitive items.

SUMMARY OF THE INVENTION

It is an object of the present invention to provide novel copolymers having anti-static properties.

It is a further object of the invention to provide anti-static varnish compositions containing such copolymers.

These objects and other objects are achieved by providing a copolymer of a salt of a quaternized acrylate and a polyalkylene glycol acrylate having the formula:

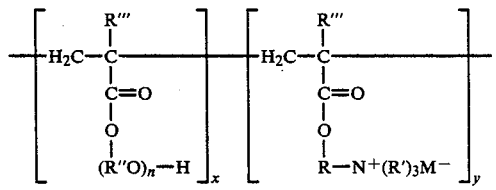

wherein:
n = 5–20;
x = 6–13;
y = 20–30;
R = an alkylene group of 1 to 5 carbon atoms;
R' = hydrogen or an alkyl group of 1 to 5 carbon atoms;
R'' = an alkylene group of 1 to 5 carbon atoms;
R''' = hydrogen or an alkyl group of 1 to 5 carbon atoms; and
$M^-$ = an anion.

Preferably, R is a methylene or ethylene group; R' is an alkyl group, most preferably a methyl group; R'' is an ethylene or propylene group; $M^-$ is the chloride ion; x is 6–9; and y is 20–25. The copolymer has a number average molecular weight in the range of 4,000–10,000, preferably 4,000–7,000. The copolymer is an effective anti-static agent in anti-static varnish compositions which are particularly useful in the field of packaging gravure printing. The copolymer preferably is mixed with a vehicle which includes coating forming material to formulate a varnish composition. The vehicle may be a mixture of: a low molecular weight polyester solution in 1:1 methylethyl ketone and n-propanol; short oil alkyd resin in xylene; melamine resin; and n-propanol. The varnish composition may also include curing catalyst, preferably p-toluenesulfonic acid, and pigment. The copolymer will usually be present in an amount of about 10 to about 30 wt. %, based on the weight of the varnish composition.

DETAILED DESCRIPTION OF THE PREFERRED EMBODIMENTS

A quaternization product of a quaternary ammonium chloride methacrylate and a polyalkylene glycol methacrylate are co-reacted to produce a copolymer which is suitable for use in an anit-static agent in a reactive coating system. The product achieves high resistivity values coupled wth excellent water resistance.

The quaternary ammonium chloride methacrylate is preferably the quaternization product of dimethylaminoethyl methacrylate/methyl chloride, but any salt of a quaternary acrylate may be used. Suitable quaternary ammonium chloride methacrylate compounds are known as Sipomer Q-6-75, and are available from Alcolac, Inc., of Baltimore, Md. The structure of this compound may be illustrated as follows:

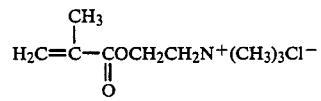

The polyalkylene glycol methacrylate is preferably polyethylene glycol methacrylate or polypropylene glycol methacrylate. Polyalkylene glycol ethacrylate may also be used. In general, any suitable polyalkylene glycol acrylate may be employed. Polyethylene glycol methacrylate, known as Sipomer HEM-5/HEM-10/HEM-20, is available from the above-mentioned Alcolac, Inc., as is polypropylene glycol methacrylate whis is known as Sipomer PPGM. The structures of these compounds may be illustrated as follows:

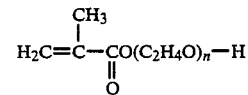

wherein n is 5, 10 or 20; and

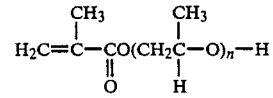

wherein n is 5 to 6.

The quaternary ammonium chloride methacylate and polyalkylene glycol methacrylate are each preferably in an alcohol solvent when reacted. Any suitable alcohol solvent may be used, for example, aliphatic alcohols such as methanol, ethanol and n-propanol. Other solvent systems may be used.

Any free radical initiator may be used in the reaction. Preferred initiators include acyl peroxides and peroxy esters which may be used in an amount of about 4 to about 10 wt. %, preferably about 5 wt. %, based upon the weight of the acrylic portion. All parts and percentages are by weight unless otherwise noted.

The quarternary ammonium chloride methacrylate and polyalkylene glycol methacrylate are generally reacted in a ratio of 3 to 1, respectively. The temperature at which the reaction generally takes place is between about 70° and about 85° C.

The polymerization reaction can generally be illustrated as follows:

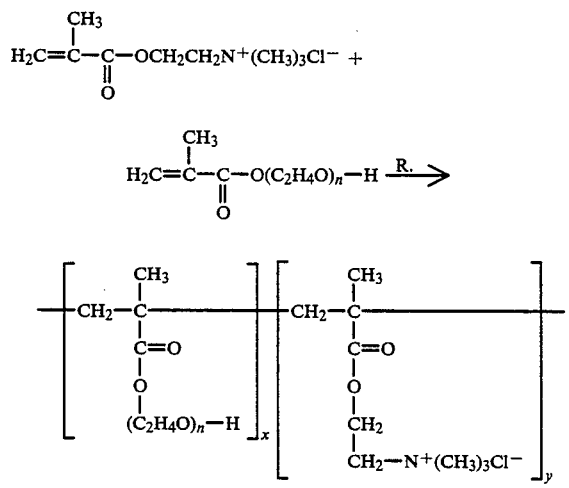

The copolymer may be formulated into a varnish using conventional technology. A suitable varnish composition will include the copolymer in addition to a vehicle, including coating-forming material, and a curing catalyst, for example, paratoluenesulfonic acid. The varnish composition may optionally include pigment.

Generally, the varnish composition has a solids content of about 40 to about 50 wt. %, preferably about 40 to about 45 wt. %, and a viscosity at 25° C. of about 0.5 to about 5 poise, preferably about 0.5 to about 2 poise.

The varnish composition may be applied by any conventional technique and cured by baking. Other curing systems may be employed.

The following Examples 1–3 generally illustrated the invention. Examples 1 and 2 illustrate how the copolymer may be prepared. Example 3 illustrates formulation of the copolymer into a varnish composition and its use in a reactive coating system.

EXAMPLE 1

213.6 parts ethanol is initially charged into a four-neck round bottom flask under a nitrogen blanket and slowly heated to reflux with agitation. The alcohol was held under reflux for 5 minutes. To this, a mixture of 160.0 parts of a 75% solution of the quaternization product of dimethylaminoethyl methacrylate/methyl chloride in water, 40.0 parts polypropylene glycol methacrylate, 217.3 parts ethanol, and 4.0 parts t-butylperoctoate were added dropwise to the refluxing solvent over a period of $1 \pm \frac{1}{4}$ hour while maintaining the temperature of 77°–80° C. Refluxing was continued until a solids determination of 25±1% indicated complete conversion of the acrylic monomers. Removal of ethanol and water was initiated until a final solids of 40±2% was obtained. The product was then cooled to room temperature and discharged. The resulting copolymer had a viscosity at 25° C. of 0.50 poise at 41% solids.

EXAMPLE 2

The procedure of Example 1 was repeated, except that ethylene glycol methacrylate was used in place of polyethylene glycol methacrylate. The results were comparable.

EXAMPLE 3

33.0 parts of a 50% low molecular weight polyester solution in 1:1 methylethyl ketone and n-propanol, 10.0 parts of a 50% short oil alkyd in xylene was mixed with 20.0 parts melamine resin and 37.0 parts n-propanol to prepare a varnish. To 50.0 parts of the varnish was added 50.0 parts of the copolymer prepared in Example 1 and 7.0 parts of p-toluenesulfonic acid. The coating was placed on a polyester film and cured at 300° F. for 30 seconds. The resultant resistivity was $10^7$ ohms, which was superior to any other commercial quaternary salts evaluated.

Some of the benefits realized by varnish compositions according to the invention are the following: (1) they impart a clear film in the cured state, (2) they can be used a higher percentages than commercial products yielding higher resistivity readings, (3) they are compatible with other resins in the reactive coating system, (4) they can be used with pigments to produce colored conductive coatings for corrugated board (Kraft) and (5) after curing, they exhibit good-excellent water resistance.

Furthermore, the varnish compositions exhibit excellent resistance properties when incorporated into a reactive coating system printed on polyester films. In this context, they can be used at higher percentages without kickout, unlike other similar commercial products. They are compatible with the materials of the reactive coating system (see Example 3). Furthermore, films resulting from curing the varnish compositions exhibit good water resistance.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A antistatic varnish composition containing up to 50 wt; so of a copolymer of a salt of a quaternized acrylate and a polyalkylene glycol acrylate having the formula:

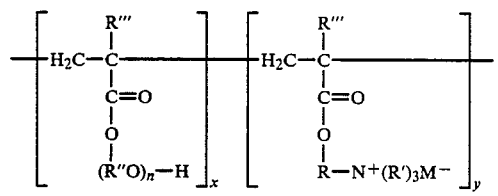

wherein:
n=5–20;
x=6–13;
y=20–30;
R=an alkylene group of 1 to 5 carbon atoms;
R'=hydrogen or an alkyl group of 1 to 5 carbon atoms;
R''=an alkylene group of 1 to 5 carbon atoms;

R''' = hydrogen or an alkyl group of 1 to 5 carbon atoms; and

M⁻ = said copolymer having a number average molecular weight in the range of 4,000 to 7,000.

2. The varnish composition of claim 1 wherein the copolymer is present in an amount fo about 10 to about 30 wt. %, based on the weight of the composition.

3. The varnish composition of claim 1, wherein R is a methylene or ethylene group.

4. The varnish composition of claim 1, wherein R' is an alkyl group.

5. The varnish composition of claim 4, wherein R' is a methyl group.

6. The varnish composition of claim 1, wherein R" is an ethylene or propylene group.

7. The varnish composition of claim 1, wherein the salt of the acrylate comprises a chloride salt of a quaternized methacrylate.

8. The copolymer of claim 7, wherein the chloride salt of the quaternized methacrylate comprises a quaternized dimethylaminoethyl methacrylate/methyl chloride.

9. The copolymer of claim 1, wherein the polyalkylene glycol acrylate is selected from the group consisting of polyethylene glycol methacrylate and polypropylene glycol methacrylate.

10. The varnish composition of claim 1, wherein x is 6-9.

11. The varnish composition of claim 1, wherein y is 20-25.

12. The copolymer of claim 1, wherein the copolymer has a number average molecular weight in the range of 4,000 to 7,000.

13. The varnish composition of claim 1, wherein the varnish comprises a mixture of polyester solution, short-oil alkyd resin, melamine resin and n-propanol.

14. The varnish composition of claim 13, wherein the polyester solution comprises a low moleculer weight polyester solution in methylethyl ketone and n-propanol.

15. The varnish composition of claim 14, wherein the methylethyl ketone and n-propanol are present in a 1:1 ratio.

16. The varnish composition of claim 13, wherein the short oil alkyd resin comprises a solution of short oil alkyd resin in xylene.

17. The varnish composition of claim 1, further comprising catalyst for curing the varnish composition.

18. The varnish composition of claim 17, wherein the catalyst comprises p-toluenesulfonic acid.

19. The varnish composition of claim 1, further comprising pigment for coloring the varnish composition.

* * * * *